United States Patent
Menath

(10) Patent No.: US 10,528,146 B2
(45) Date of Patent: Jan. 7, 2020

(54) METHOD FOR CONTROLLING A VEHICLE SYSTEM

(71) Applicant: Bayerische Motoren Werke Aktiengesellschaft, Munich (DE)

(72) Inventor: Andreas Menath, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 206 days.

(21) Appl. No.: 15/622,864

(22) Filed: Jun. 14, 2017

(65) Prior Publication Data

US 2017/0285762 A1    Oct. 5, 2017

Related U.S. Application Data

(63) Continuation of application No. PCT/EP2015/077178, filed on Nov. 20, 2015.

(30) Foreign Application Priority Data

Dec. 15, 2014   (DE) .................. 10 2014 225 796

(51) Int. Cl.
  *G06F 3/01* (2006.01)
  *B60K 37/06* (2006.01)
  *G06F 3/03* (2006.01)

(52) U.S. Cl.
  CPC .............. *G06F 3/017* (2013.01); *B60K 37/06* (2013.01); *B60K 2370/146* (2019.05); *B60K 2370/21* (2019.05); *G06F 3/0304* (2013.01)

(58) Field of Classification Search
  CPC ....... G06F 3/017; G06F 3/0304; B60K 37/06; B60K 2350/1052; B60K 2350/2013

(Continued)

(56) References Cited

U.S. PATENT DOCUMENTS 5,825,352 A * 10/1998 Bisset .................. G06F 3/044
                                               345/173
5,880,411 A *  3/1999 Gillespie ............ G06F 3/03547
                                               178/18.01

(Continued)

FOREIGN PATENT DOCUMENTS

DE        101 53 610 A1    6/2002
DE    10 2013 201 675 A1    8/2014

(Continued)

OTHER PUBLICATIONS

German-language Search Report issued in counterpart German Application No. 10 2014 225 796.4 dated Oct. 23, 2015 with partial English translation (14 pages).

(Continued)

*Primary Examiner* — Tuan C To
(74) *Attorney, Agent, or Firm* — Crowell & Moring LLP

(57) ABSTRACT

A method for controlling a vehicle system by a user is provided. A series of sensor data is received, where a series of positions is generated and the position of a body part is determined from each element of the series of sensor data. A first position, a second position, and a third position are selected from the series of positions, and a first circumferential angle is determined, the angle being defined by the first, second, and third positions. A first circular direction in the clockwise direction is detected if the first circumferential angle lies between a first lower threshold value and a first upper threshold value, and a first circular direction in the counter clockwise direction is detected if the first circumferential angle lies between a second lower threshold value and a second upper threshold value. The vehicle system is controlled depending on the first circular direction detected.

16 Claims, 3 Drawing Sheets

(58) Field of Classification Search
USPC .......................................................... 701/36
See application file for complete search history.

(56) References Cited

U.S. PATENT DOCUMENTS

| | | | |
|---|---|---|---|
| 7,564,449 | B2 | 7/2009 | Layton et al. |
| 8,219,936 | B2 | 7/2012 | Kim et al. |
| 8,823,645 | B2* | 9/2014 | Kryze .................... G06F 1/266 |
| | | | 345/158 |
| 9,158,454 | B2* | 10/2015 | Westerman ......... G06F 3/04883 |
| 9,477,315 | B2* | 10/2016 | Fujimura ................ G02B 27/01 |
| 2002/0118880 | A1 | 8/2002 | Liu et al. |
| 2006/0232611 | A1 | 10/2006 | Brooke |
| 2007/0124702 | A1 | 5/2007 | Morisaki |
| 2009/0058800 | A1 | 3/2009 | Ishigaki et al. |
| 2010/0027892 | A1 | 2/2010 | Guan et al. |
| 2010/0050134 | A1 | 2/2010 | Clarkson |
| 2010/0060570 | A1* | 3/2010 | Underkoffler ........... G06F 3/017 |
| | | | 345/156 |
| 2010/0251188 | A1 | 9/2010 | Fu et al. |
| 2011/0161843 | A1* | 6/2011 | Bennett .................... G06F 3/14 |
| | | | 715/760 |
| 2011/0239155 | A1* | 9/2011 | Christie .................. G06F 3/044 |
| | | | 715/784 |
| 2011/0310007 | A1 | 12/2011 | Margolis et al. |
| 2012/0162078 | A1* | 6/2012 | Ferren ................. G06F 3/04886 |
| | | | 345/168 |
| 2013/0024071 | A1* | 1/2013 | Sivertsen ............... B60K 35/00 |
| | | | 701/41 |
| 2014/0059501 | A1 | 2/2014 | Yuu et al. |
| 2016/0039429 | A1* | 2/2016 | Abou-Nasr ........... B60W 50/10 |
| | | | 382/103 |

FOREIGN PATENT DOCUMENTS

| | | |
|---|---|---|
| EP | 2 672 374 A1 | 12/2013 |
| WO | WO 2013/075005 A1 | 5/2013 |

OTHER PUBLICATIONS

International Search Report (PCT/ISA/210) issued in PCT Application No. PCT/EP2015/077178 dated Apr. 21, 2016 with English translation (9 pages).

German-language Written Opinion (PCT/ISA/237) issued in PCT Application No. PCT/EP2015/077178 dated Apr. 21, 2016 (7 pages).

Xavier et al., "Fast Line, Arc/Circle and Leg Detection from Laser Scan Data in a Player Driver", Proceedings of the IEEE International Conference on Robotics and Automation, Apr. 18, 2005 (six (6) pages total), XP010871534.

* cited by examiner

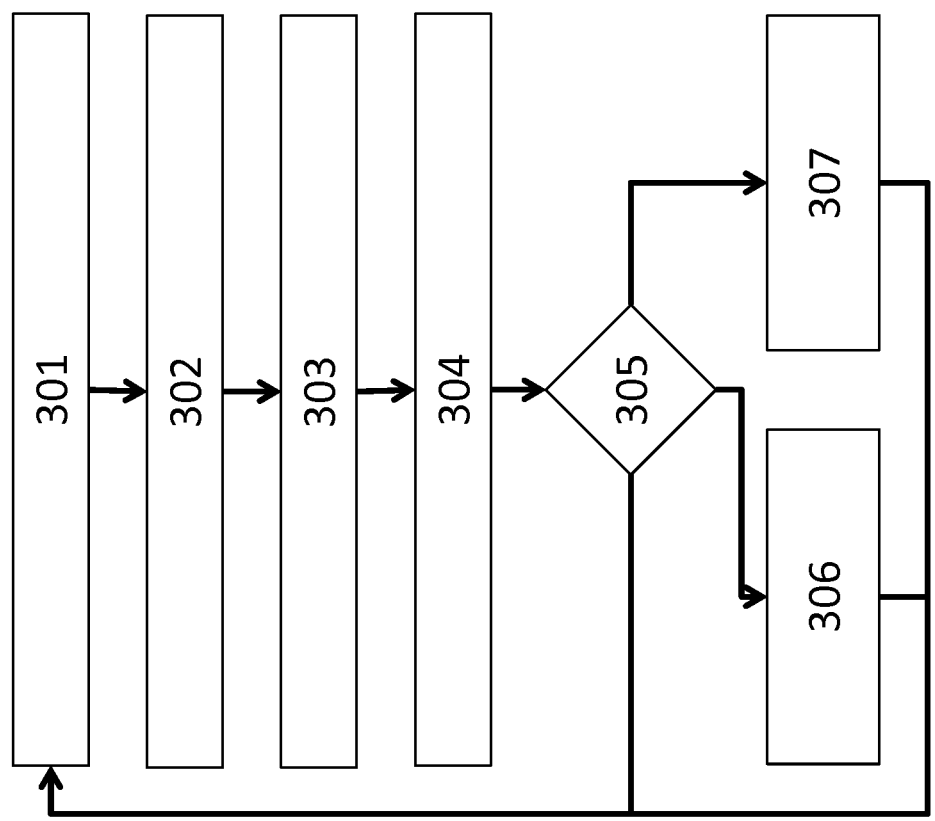

METHOD FOR CONTROLLING A VEHICLE SYSTEM

CROSS REFERENCE TO RELATED APPLICATIONS

This application is a continuation of PCT International Application No. PCT/EP2015/077178, filed Nov. 20, 2015, which claims priority under 35 U.S.C. § 119 from German Patent Application No. 10 2014 225 796.4, filed Dec. 15, 2014, the entire disclosures of which are herein expressly incorporated by reference.

BACKGROUND AND SUMMARY OF THE INVENTION

The present invention relates to a method for controlling a vehicle system, an analysis module, and a vehicle.

For the purpose of controlling vehicle systems by the user of a vehicle, conventionally, switches provided the user with immediate haptic feedback on an operating action that has been performed. Over the years, the number of vehicle systems to be operated (e.g., light, music systems, navigation systems, telephone systems, velocity control systems, distance control systems, lane departure warning systems, etc.) has increased whereby controlling each of the vehicle systems using its own respective switch has been found to be impractical. In the meantime, rotary/push switches have been predominantly used to control the vehicle systems in combination with a predefined menu structure. Also, it is known to control the vehicle systems using voice inputs. The limited number of input possibilities with a rotary/push switch may require very complex menu structures. On the other hand, ambient noises, for example, of a convertible vehicle traveling through a tunnel may make it difficult to reliably identify voice inputs.

In at least that regard, the present invention is directed to a method for controlling a vehicle system, an analysis module, and a vehicle that avoids at least the above-described disadvantages of the known methods.

In accordance with one or more embodiments of the disclosure, a method for controlling a vehicle system by a user is provided. A sequence of sensor data from a sensor system is received and a sequence of positions is generated by the position of a body part being determined from each element in the sequence of sensor data, where a first position, a second position temporally following the first position, and a third position temporally following the second position are selected from the sequence of positions. Moreover, a first circumferential angle, defined by the first position, the second position, and the third position, is determined. A first circular direction in the clockwise direction is identified if the first circumferential angle is between a first lower threshold value v and a first upper threshold value $\pi-w$. A first circular direction in the anticlockwise direction is identified if the first circumferential angle between a second lower threshold value $\pi+v$ and a second upper threshold value $2\pi-w$. The vehicle system is controlled based on the first circular direction identified, and thus, the vehicle system is operated in an intuitive manner.

The sensor data, for example, may be provided by a sensor system in the form of a camera. The camera may be, for example, a monochrome camera which is sensitive in the range of visible light. A monochrome camera may enable a higher resolution of the sensor data, in particular, a higher resolution of the image data. Moreover, a monochrome camera may exhibit little noise. A color camera may be used when determining the position of a body part. For example, skin tones can stand out well from the background and can make it possible to more easily determine the position of a body part. In another example, an infrared camera may be used. An infrared camera may be favorable in poor light conditions. An infrared camera may also allow the determination of the position of the body part based on the radiated heat. The camera may be a 2-D camera which can be used to obtain a two-dimensional image of the environment and therefore a two-dimensional determination of the position of the body part. Moreover, a 3-D camera may be used as the sensor system so as to determine, for example, the position of the body part in three dimensions, which makes it possible to identify circumferential angles that are in a plane parallel to the camera axis.

The sensor data may be received regularly, for example, in periodical intervals. In one aspect, the sensor data may be queried and/or received at least every 20 ms so as to identify the circle gesture in a robust manner. The vehicle system may be controlled in a precise manner if, for example, the sensor data is queried at least every 12 ms. If the interval of time between the reception of the sensor data is limited to more than 5 ms, the noise in the sensor data may be reduced by a low-pass filter.

According to one or more embodiments of the disclosure, the movements of different body parts may be used to control the vehicle system. For example, the position of a finger, such as the thumb or the index finger may be used. The position of a finger can be determined using sensor systems. In one example, the use of the position of the wrist to control the vehicle system can simplify the movement analysis as a result of the position changes that are typically smoother than a finger. Moreover, in another example, the position of an object held by the user can also be determined instead of the position of a body part.

By way of another example, the first position, the second position, and the third position need not be temporally immediately successive positions in the sequence of positions. For example, the position at the time "t_n" may be used as the first position, the position at the time "t_(n+k)" may be used as the second position and the position at the time "t_(n+k+1)" may be used as the third position.

If a circular direction is not identified with the necessary reliability (e.g., in other words, if neither a circular direction in the clockwise direction nor a circular direction in the anticlockwise direction has been identified), possible incorrect operation of the vehicle system can be avoided.

The preselected values "v" and "w" may be between $\pi/40$ and $\pi/20$, for example. In one aspect, the values v and w may be identical so that the calculation can be simplified based on the symmetrical boundary conditions.

In one embodiment of the invention, the second position is selected based on the interval of time from the first position and the third position is selected based on the interval of time from the second position. In another embodiment, when the positions are periodically determined, the first position, the second position, and the third position may be selected in advance so the invention can be implemented with little outlay. In yet another embodiment, the intervals of time between the first position and the second position and the intervals of time between the second position and the third position may be selected to be the same.

In accordance with another embodiment of the invention, the second position may be selected based on the spatial distance from the first position, and the third position may be selected based on the spatial distance from the second position.

A spatial distance between the first position and the second position and between the second position and the third position above a certain limit value may increase reliability when identifying a circular movement. A spatial distance of more than 1 cm, for example more than 3 cm, has been found to be reliable. In order to also be able to detect smaller circular movements by a user, the spatial distance between the first position and the second position and the spatial distance between the second position and the third position may be kept shorter than 10 cm.

According to yet another embodiment of the invention, a first circle including a first circle center point, a first circle radius, and/or a first circle plane is determined based on the first position, the second position, and the third position.

The first position, the second position, and the third position may be positions on the circumference of the first circle and the position and size of the circle in two-dimensional or three-dimensional space may be determined. For example, the parameters of the circle may be used to individually control the vehicle system.

According to an embodiment of the disclosure, the vehicle system may be controlled based on the first circle radius. For instance, the volume of a music system is controlled using a first circle, such as a first circle gesture, the first circle radius of which is greater than 10 cm. Another first circle, the first circle radius of which is less than 8 cm, may allow the user to browse through the individual titles in a music album.

Not all movements performed by the user of a vehicle may be intended to control a vehicle system. For example, the driver of the vehicle may use his or her right hand to describe a quadrant gesture in order to reach for sunglasses in the glove compartment or in the center console. As such, the vehicle system may be controlled only when the first circle radius is between 1 cm and 40 cm. A desired circle gesture may typically be assumed with a first circle radius of more than 5 cm. If the circle radius is less than 20 cm, the space to be sensed by the sensor system can be kept to a reasonable size.

According to an additional embodiment of the disclosure, the vehicle system is controlled if the first circle center point is within a predefined activation square or a predefined activation cube. As described above, not every circle-like movement performed by the user of a vehicle is intended to control a vehicle system. For instance, specifying an activation square or an activation square with an edge length of 5 cm to 15 cm, e.g., 10 cm, may reduce the risk of unintentional operation of the vehicle system. A plurality of activation squares or activation cuboids may be provided that are spatially separate from one another and may be used to control different vehicle systems or different functions of the same vehicle system.

In accordance with another embodiment, the vehicle system is controlled based on the orientation of the first circle plane with respect to a predefined plane. The orientation of the circle plane may provide a further degree of freedom for operating the vehicle system. When operating a music system, for example, a first circle plane, the surface normal of which is oriented parallel to the vehicle longitudinal axis, may allow the user to browse through the individual tracks in a music album. Alternatively, a first circle plane, the surface normal of which runs parallel to the vehicle transverse axis, may allow the user to select a particular music album.

In accordance with yet another embodiment, the vehicle system may be controlled based on a first circle sector angle which is defined by the first position, the first circle center point, and the third position. Specifying a first circle sector angle above a predetermined threshold may increase the certainty that a desired gesture of the user is present. The circle sector angle may also be used as a parameter for controlling the vehicle system. For example, in the instance of a small circle sector angle, the map from a navigation system may be enlarged to a lesser extent than in the instance of a larger circle sector angle.

According to a further embodiment, the vehicle system is controlled based on a first average circle sector angular velocity between the first position and the third position. As such, a further parameter for controlling the vehicle system may be obtained. In one example, a high first average circle sector angular velocity, for example above $2\pi$ per second ($2\pi/s$), may allow a user to browse through music titles with spacings of 10 music titles. Moreover, a low circle sector velocity, for example below $0.5\ \pi/s$, may allow a user to browse through the individual music titles.

According to another embodiment, the vehicle system may be controlled based on the length of a first circumferential section between the first position and the third position. For example, the length of the first circumferential section between the first position and the third position may be perceived by a user as a natural measure for changing a parameter of a vehicle system. The aforementioned embodiment can therefore make it possible to operate the vehicle system in an intuitive manner.

According to a yet another embodiment, the vehicle system is controlled based on a first average circumferential velocity between the first position and the third position. Users may perceive the first average circumferential velocity, which is also influenced by the first circle radius in addition to the first circle sector velocity, as a more natural specification of the velocity at which a parameter of a vehicle system is intended to be changed. This configuration can therefore make it possible for users to quickly adapt.

In a further embodiment of the disclosure, the vehicle system provides a fourth position temporally following the first position, a fifth position temporally following the fourth position, and a sixth position temporally following the fifth position to be selected from the sequence of positions, where a second circumferential angle, defined by the fourth position, the fifth position, and the sixth position, is determined. A second circular direction in the clockwise direction is identified if the second circumferential angle is between a lower threshold value "a" and an upper threshold value "$\pi$–b." A second circular direction in the anticlockwise direction is identified if the second circumferential angle is between a lower threshold value "$\pi$+a" and an upper threshold value "$2\pi$–b." For example, the vehicle system is controlled based on the match between the first circular direction and the second circular direction. The three additional positions may improve the robustness when identifying the circle gesture and may therefore reduce the risk of incorrect operation. Even though only one additional set of three positions (e.g., fourth position, fifth position, sixth position) is described herein, it may be understood that more sets of three positions may be used, which may be used continuously in order to continuously check the plausibility of the control inputs received.

In yet another embodiment, a second circle includes a second circle center point, a second circle radius, and/or a second circle plane is determined based on the fourth position, the fifth position, and the sixth position. The vehicle system may be controlled based on the distance between the second circle center point and the first circle center point and/or the difference between the second circle radius and the first circle radius, and/or the deviation of the second circle plane from the first circle plane.

The vehicle system may be controlled, for example, only when the distance between the second circle center point and the first circle center point is less than a predetermined circle center point distance, such as 10 cm.

According to another embodiment, a pose may be determined based on the sensor data for the first position and/or for the second position and/or for the third position, and for the driver assistance system to be controlled based on the identified pose. A pose may be, for example, the extension of a particular number of fingers or of particular fingers of a user. For example, the volume may be changed only when it is identified that the user is extending an index finger. Poses may not be randomly struck by a user and may therefore be a good indicator of whether or not the user desires to control the vehicle system.

An analysis module including at least one processor for executing stored instructions to carry out a method for controlling a vehicle system, as described in detail above, may allow a user to operate a vehicle system in an intuitive manner.

A vehicle which has a sensor system and an analysis module described above may increase traffic safety by reducing risks of distractions that are caused by complicated operations in a vehicle system.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 illustrates a flowchart in accordance with one or more aspects of the disclosure.

DETAILED DESCRIPTION OF THE DRAWINGS

Figure 1:
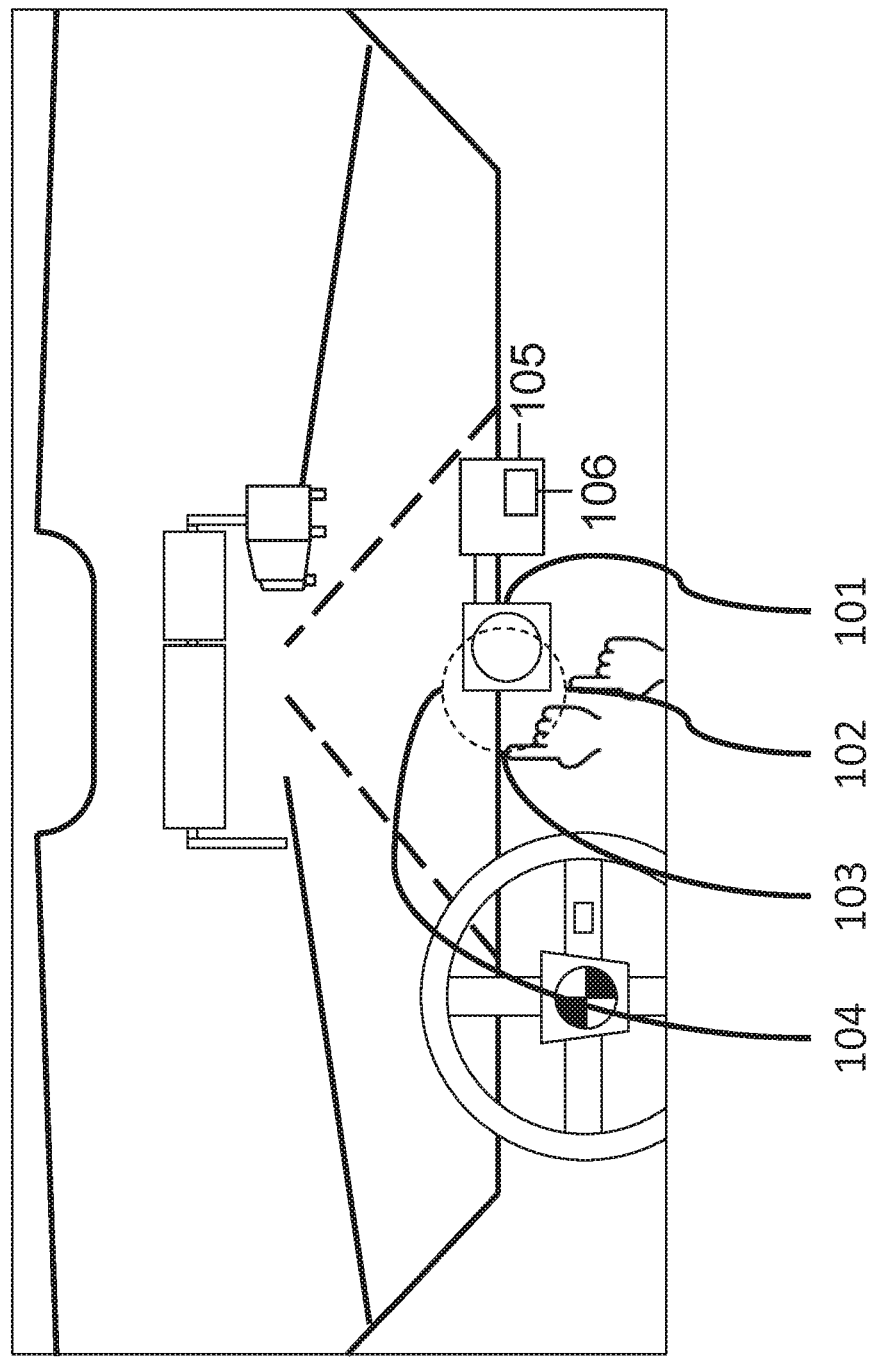
FIG. 1 illustrates a vehicle cockpit in accordance with one or more aspects of the disclosure.

FIG. 1 illustrates a cockpit of a vehicle. The user of the vehicle, e.g., the driver, moves an index finger in the form of a circle 104 in front of a sensor system 101 in the center console. At a first time, the tip of the index finger is at the position 102, for example, and is at the position 103 at a second time. The sensor system 101 may be a 3-D camera which senses the movement. An analysis module 105, including at least one processor 106 for executing stored instructions to perform the method of the present invention, is coupled to the sensor system 101 and receives the sequence of sensor data from the sensor system. The user of the vehicle strikes a pose in the form of an extended index finger and a folded thumb. By way of example, the circle gesture and the pose identified by the sensor system 101 may be used to change the volume of the music system.

Figure 2:
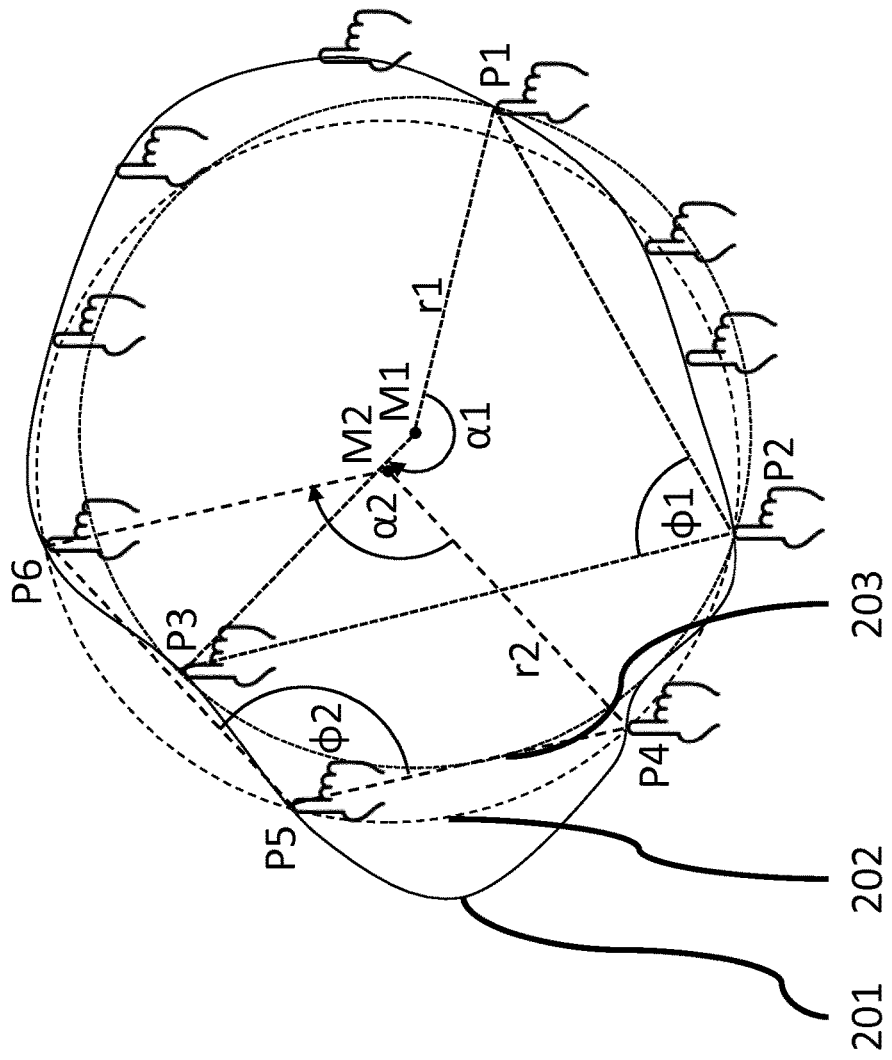
FIG. 2 illustrates a circle gesture diagram in accordance with one or more aspects of the disclosure.

FIG. 2 illustrates a diagram containing different positions of the index finger. While FIG. 2 is a two-dimensional illustration, it may be understood that three-dimensional positions may be used.

The user of the vehicle uses an index finger to typically carry out a movement 201 which is approximately in the form of a circle. In this example, the finger successively assumes different positions in space, of which only the positions P1 to P6 are designated in order to avoid overloading the drawing. The designation of the positions does not relate to their temporal sequence. For instance, two further positions may lie between the positions P1 and P2 and the position P5 is assumed before the position P3.

A first circumferential angle $\varphi 1$ and a second circumferential angle $\varphi 2$ are respectively determined based on the positions P1 to P3 and P4 to P6. For each of the circumferential angles $\varphi 1$ and $\varphi 2$, it is determined whether the circumferential angle is within predefined ranges and accordingly whether there is a circular direction in the clockwise direction or in the anticlockwise direction. As such, a parameter of the vehicle system is changed only if the circular direction matches.

A first circle 203 and a second circle 202, which are indicated by a first center point M1 and a second center point M2, respectively, and a first radius r1 and a second radius r2, respectively, may be determined based on the positions P1 to P6. As shown in FIG. 1, the center points M1 and M2 may be at a certain distance from one another based on the potato-like trajectory 201 of the user's index finger. For the same reasons, the first radius r1 and the second radius r2 are not necessarily identical. In some examples, only certain deviations may be allowed in order to still be able to assume a circle gesture. The first circle sector angle $\alpha 1$ and the second circle sector angle $\alpha 2$ may be used to find out the value by which a parameter of the vehicle system is intended to be changed.

FIG. 3 illustrates a flowchart of the method steps as executed by the stored instructions of the at least one processor of the analysis module for controlling a vehicle system in accordance with one or more aspects of the disclosure. In a step 301, a sequence of sensor data from a sensor system is received. In a step 302, the position of a body part is determined from each element in the sequence of sensor data and a sequence of positions is therefore generated. In step 303, a first position, a second position temporally following the first position, and a third position temporally following the second position are selected from the sequence of positions. A first circumferential angle, defined by the first position, the second position, and the third position, are determined in step 304. In step 305, a first circular direction in the clockwise direction is identified if the first circumferential angle ($\varphi 1$) is between a first lower threshold value v and a first upper threshold value $\pi-w$, and a first circular direction in the anticlockwise direction is identified if the first circumferential angle ($\varphi 1$) is between a second lower threshold value n+v and a second upper threshold value $2\pi-w$. The vehicle system is controlled either according to step 306 or step 307 based on the first identified circular direction.

One of the numerous advantages is that the invention makes it possible to robustly identify a circle gesture.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a vehicle system by a user, the method comprising the acts of:
   receiving a sequence of sensor data from a sensor system;

generating a sequence of positions based on a position of a body part being determined from each element in the sequence of sensor data;

selecting a first position, a second position temporally following the first position, and a third position temporally following the second position from the sequence of positions;

determining a first circumferential angle, wherein the first circumferential angle is defined by the first position, the second position, and the third position;

identifying that a first circular direction is in a clockwise direction if the first circumferential angle is between a first lower threshold value and a first upper threshold value;

identifying that the first circular direction is in an anticlockwise direction if the first circumferential angle is between a second lower threshold value and a second upper threshold value; and controlling the vehicle system based on the identified first circular direction.

2. The method according to claim 1, wherein the second position is selected based on an interval of time from the first position, and wherein the third position is selected based on an interval of time from the second position.

3. The method according to claim 1, wherein the second position is selected based on a spatial distance from the first position, and wherein the third position is selected based on a spatial distance from the second position.

4. The method according to claim 1, further comprising the act of determining a first circle based on the first position, the second position, and the third position, wherein the first circle includes one or more of: (i) a first circle center point, (ii) a first circle radius, and (iii) a first circle plane.

5. The method according to claim 4, wherein the vehicle system is controlled based on the first circle radius.

6. The method according to claim 4, wherein the vehicle system is controlled if the first circle center point is within a predefined activation square or within a predefined activation cube.

7. The method according to claim 4, wherein the vehicle system is controlled based on an orientation of the first circle plane with respect to a predefined plane.

8. The method according to claim 4, wherein the vehicle system is controlled based on a first circle sector angle, the first circle sector angle defined by the first position, the first circle center point, and the third position.

9. The method according to claim 1, wherein the vehicle system is controlled based on a first average circle sector angular velocity between the first position and the third position.

10. The method according to claim 1, wherein the vehicle system is controlled based on a length of a first circumferential section between the first position and the third position.

11. The method according to claim 1, wherein the vehicle system is controlled based on a first average circumferential velocity between the first position and the third position.

12. The method according to claim 1, further comprising the acts of:

selecting a fourth position temporally following the first position, a fifth position temporally following the fourth position, and a sixth position temporally following the fifth position from the sequence of positions;

determining a second circumferential angle, wherein the second circumferential angle is defined by the fourth position, the fifth position, and the sixth position;

identifying that a second circular direction is in the clockwise direction if the second circumferential angle is between a third lower threshold value and a third upper threshold value;

identifying that a second circular direction is in the anticlockwise direction if the second circumferential angle is between a fourth lower threshold value and a fourth upper threshold value; and controlling the vehicle system based on a match between the first circular direction and the second circular direction.

13. The method according to claim 12, further comprising the acts of:

determining a second circle based on the fourth position, the fifth position, and the sixth position, wherein the second circle includes one or more of: (i) a second circle center point, (ii) a second circle radius, and (iii) a second circle plane; and controlling the vehicle system based on one or more of: (i) a distance between the second circle center point and the first circle center point, (ii) a difference between the second circle radius and the first circle radius, and (iii) a deviation of the second circle plane from the first circle plane.

14. The method according to claim 1, further comprising the acts of:

determining a pose based on the sensor data for each position; and controlling the driver assistance system based on the determined pose.

15. An analysis module comprising:

at least one processor for executing stored instructions to:

receive a sequence of sensor data from a sensor system;

generate a sequence of positions based on a position of a body part being determined from each element in the sequence of sensor data;

select a first position, a second position temporally following the first position, and a third position temporally following the second position from the sequence of positions;

determine a first circumferential angle, wherein the first circumferential angle is defined by the first position, the second position, and the third position;

identify that a first circular direction is in a clockwise direction if the first circumferential angle is between a first lower threshold value and a first upper threshold value;

identify that the first circular direction is in an anticlockwise direction if the first circumferential angle is between a second lower threshold value and a second upper threshold value; and control a vehicle system based on the identified first circular direction.

16. The analysis module according to claim 15, wherein the analysis module and the sensor system are included in a vehicle.

* * * * *